US008059488B2

United States Patent
Reiche

(10) Patent No.: US 8,059,488 B2
(45) Date of Patent: Nov. 15, 2011

(54) METHOD FOR OPERATING AN ULTRASONIC SENSOR, AND CORRESPONDING ULTRASONIC SENSOR

(75) Inventor: Martin Reiche, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 452 days.

(21) Appl. No.: 12/315,660

(22) Filed: Dec. 5, 2008

(65) Prior Publication Data
US 2009/0180352 A1    Jul. 16, 2009

(30) Foreign Application Priority Data

Jan. 16, 2008  (DE) .......................... 10 2008 004 630

(51) Int. Cl.
*B06B 1/06*     (2006.01)
(52) U.S. Cl. ...................................................... 367/135
(58) Field of Classification Search .................. 367/140, 367/903, 135, 137; 370/246
See application file for complete search history.

(56) References Cited

U.S. PATENT DOCUMENTS

| 6,506,160 B1 | 1/2003 | Van Stralen et al. |
| 2005/0261589 A1 | 11/2005 | Daft et al. |
| 2009/0180352 A1* | 7/2009 | Reiche .......................... 367/140 |

FOREIGN PATENT DOCUMENTS

| EP | 0 151 003 | 8/1985 |
| EP | 2081047 A2 * | 7/2009 |
| WO | WO 95/02197 | 1/1995 |

* cited by examiner

*Primary Examiner* — Daniel Pihulic
(74) *Attorney, Agent, or Firm* — Kenyon & Kenyon LLP

(57) ABSTRACT

In a method for operating an ultrasonic sensor in duplex mode, a transmission trigger for triggering an acoustic transmitted signal is transmitted from a control device for controlling the ultrasonic sensor to the ultrasonic sensor via a first duplex channel at a multiple of a resonance frequency of an ultrasonic converter in the ultrasonic sensor. The transmission trigger is subsequently divided down to the resonance frequency of the converter in the ultrasonic sensor. At least one acoustic received signal which corresponds to the acoustic transmitted signal and which is delayed with respect to the reflection at an object due to the acoustic propagation time is converted by the ultrasonic sensor, using the converter, to an electrical received signal which is transmitted from the ultrasonic sensor to the control via a second duplex channel at the resonance frequency of the ultrasonic converter in the ultrasonic sensor.

16 Claims, 1 Drawing Sheet

METHOD FOR OPERATING AN ULTRASONIC SENSOR, AND CORRESPONDING ULTRASONIC SENSOR

FIELD OF THE INVENTION

The present invention relates to a method for operating an ultrasonic sensor, and a corresponding ultrasonic sensor.

BACKGROUND INFORMATION

Although applicable to any given ultrasonic sensors and in various fields, the exemplary embodiments and/or exemplary methods of the present invention and the issues on which it is based are explained with regard to ultrasonic sensors which employ pulse propagation time methods, and the use of same in motor vehicles.

Ultrasonic sensors, in particular ultrasonic sensors which employ pulse propagation time methods, are used, for example, to perform automatic surroundings reconnaissance, for example in motor vehicles as parking assistance. A sensor emits an ultrasonic signal. The ultrasonic signal is reflected from an object or obstruction. The same sensor or a different sensor receives the reflected signal (referred to below as "received signal"), and from the received signal draws conclusions concerning the surroundings or obstructions. In the case of an ultrasonic sensor employing a pulse propagation time method, a signal burst having a predetermined pulse repetition interval, a defined burst length, and a defined signal frequency is transmitted as an ultrasonic signal for reconnaissance of the surroundings. The ultrasonic signal or the signal burst is generally referred to below as a "sonic transmitted signal."

An active analogous duplex operation (for example, two-wire duplex operation) is often used for these types of ultrasonic sensors. In known methods, the capacitance of an ultrasonic sensor is charged on a line in the time-division multiplex. For three-wire designs a separate line may be provided for supplying power to the sensor. In such a case the duplex operation is carried out on a common line only between electrical transmission triggers and electrical received signals. An (electrical) transmission trigger which activates the ultrasonic sensor and thus the transmission of sonic transmitted signals (ultrasonic signals or signal bursts), i.e., acoustic transmitted signals of the ultrasonic sensor, is transmitted from a control unit, at the resonance frequency of a converter that is used (generally 40 kHz to 60 kHz), to the ultrasonic sensor. For cost reasons the frequency generation at the control unit is performed by the controller (μC) placed at that location. The (electrical) transmission trigger, for example in the form of a square wave signal, contains the transmission duration and the excitation frequency or resonance frequency.

If an object is present in the relevant surroundings, i.e., the surroundings to be searched by the ultrasonic sensor, the sonic or acoustic transmitted signal is reflected from this object. As a result of the acoustic reflection of the sonic or acoustic transmitted signal at the object the ultrasonic sensor receives an acoustic received signal. In the ultrasonic sensor the acoustic received signal is converted to an electrical signal by an ultrasonic converter, electrically amplified and AC-coupled to the same line, transmitted back to the control unit, and AC-decoupled in the control unit. In the control unit the decoupled received signal is subjected to a comparison, the comparison typically being performed on envelopes in a comparator with respect to a fixed threshold value or a simple characteristic curve, for example output by a μC. The envelope is implemented, for example, by noncoherent AM demodulation (for example, rectification and low-pass filtering).

The duplex operation of the transmission trigger and the back-transmission of the received signal are carried out in the same useful band at a carrier frequency which is similar or identical to the resonance frequency of the ultrasonic converter used (40 kHz to 60 kHz). The use of similar or even identical frequencies for the transmission trigger as well as for the analogous back-transmission of the electrical received signal requires a complicated locking of the transmission triggering in the ultrasonic sensor. The transmission triggering must be locked because the received signals electrically back-transmitted or reflected to the sensor may result in an unintended triggering of a transmission.

SUMMARY OF THE INVENTION

Compared to conventional approaches, the exemplary method according to the present invention for operating an ultrasonic sensor, the ultrasonic sensor according to the present invention, and the device according to the present invention for controlling the ultrasonic sensor offer the advantage that complicated locking of the transmission triggering is not required.

A transmission trigger is transmitted to the ultrasonic sensor from a device for controlling the ultrasonic sensor, i.e., a control unit, to trigger an acoustic transmitted signal using a first duplex channel at a multiple of the resonance frequency of an ultrasonic converter provided in the ultrasonic sensor. The ultrasonic sensor has an electronics system and an electroacoustic element which is used for transmitting and receiving ultrasonic signals. The electroacoustic element is referred to below as an "ultrasonic converter."

The transmission trigger is then divided down in the ultrasonic sensor in such a way that the transmission trigger is once again at the resonance frequency of the ultrasonic converter. Acoustic received signals which during the search of the surroundings are received from the ultrasonic sensor at the resonance frequency of the ultrasonic converter after an acoustic transmitted signal (ultrasonic signal or signal burst) is transmitted are converted to electrical signals by the converter, electrically amplified, and are then electrically transmitted to the control unit in the frequency band of the ultrasonic converter via a second duplex channel.

Thus, it is not possible for a back-transmitted electrical received signal to produce an unintended triggering of a transmission, since the duplex channels via which transmission triggers are transmitted from the control unit to the ultrasonic sensor and via which electrical received signals are transmitted from the ultrasonic sensor to the transmitter are spectrally separated on the line, i.e., in the band used, by the use according to the exemplary embodiments and/or exemplary methods of the present invention. Although the corresponding duplex channels, i.e., the transmission triggers and the electrical received signals, are implemented on a common line as a "physical layer," they are separated on a shared conductor as the result of the frequency band selection and the type of coupling or decoupling.

Thus, the concept on which the exemplary embodiments and/or exemplary methods of the present invention is based lies in spectrally separating on the line the duplex channels which are used for transmitting transmission triggers and for transmitting electrical received signals, the trigger being transmitted from the control unit to the ultrasonic sensor at a multiple of the resonance frequency of the ultrasonic converter in the ultrasonic sensor, and the electrical received signals being transmitted from the control unit to the ultrasonic sensor at the resonance frequency of the ultrasonic converter in the ultrasonic sensor.

In addition, since complicated transmission locking is not required, as a result of the exemplary embodiments and/or exemplary methods of the present invention there is much less complexity of components in the transmitter and in the ultrasonic sensor.

The features stated in the subclaims concern advantageous refinements of and improvements on the subject matter of the exemplary embodiments and/or exemplary methods of the present invention.

According to one exemplary refinement, the at least one electrical received signal to be transmitted from the ultrasonic sensor to the control unit is impressed on the line using a current source. The above-described approaches used heretofore use an AC-connected voltage source for impressing electrical received signals. Improved resistance to interference by coupling E fields is achieved by the impressing according to the exemplary embodiments and/or exemplary methods of the present invention, using a current source. In addition, a further channel separation in addition to the spectral separation is achieved, since the channel used to transmit transmission triggers is voltage-driven, and the channel used to transmit electrical received signals is current-driven.

According to the refinement it is possible, for example, to provide drivers or transmitters, i.e., sending or transmitting units, of the transmission triggers and/or electrical received signals with corresponding detectors as receivers at the end of the particular line. At the end of the particular line, for example, a high-resistance detector may be provided for the voltage operation, and a low-resistance detector may be provided for the current operation.

Furthermore, the exemplary embodiments and/or exemplary methods of the present invention also allows the separation of bias voltage levels of the transmission triggers and the electrical received signals. Therefore, there is no explicit charging state for a necessarily large sensor capacitance. The ultrasonic sensor is continuously supplied with current during the reception. Use of a coil in the control unit, which represents a costly component, is therefore unnecessary.

According to a further refinement the pulse duty factor of the trigger signal may be varied. In this manner information concerning a desired transmission current level may be transmitted. This information may be transmitted in addition to the information concerning the transmission duration and transmission frequency.

Furthermore, a transmission current may be used which is proportional to the transmission acoustic pressure. In a simple manner a transmission trigger may thus contain information such as transmission frequency, burst length, and transmission level, which is important for operating the ultrasonic sensor or for transmitting signal bursts (i.e., acoustic transmitted signals or ultrasonic signals) for searching and scanning the surroundings.

Exemplary embodiments of the present invention are illustrated in the drawings and explained in greater detail in the following description.

DETAILED DESCRIPTION

Figure 1:
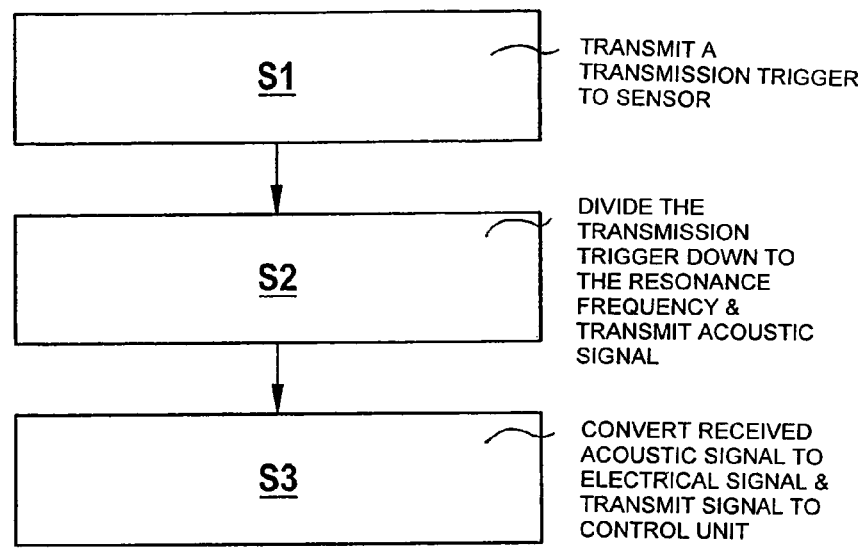
FIG. 1 shows a flow chart of the method for operating an ultrasonic sensor in duplex mode according to one specific embodiment of the present invention.

FIG. 1 shows a flow chart of the method for operating an ultrasonic sensor in duplex mode according to one exemplary embodiment of the present invention.

The method of FIG. 1 relates in particular to the operation of an ultrasonic sensor which employs a pulse propagation time method. The steps of the method for operating an ultrasonic sensor according to one exemplary embodiment of the present invention are explained below, for example using the ultrasonic sensor for parking assistance in an automobile.

In a first step S1 a transmission trigger (for example, a square wave signal having a length of 300 μs at a frequency of 100 kHz) for triggering an acoustic transmitted signal is (electrically) transmitted from a control unit to the ultrasonic sensor via a first duplex channel at a multiple of the resonance frequency of the ultrasonic converter in the ultrasonic sensor. In this manner it is indicated that the search or scanning of the surroundings for possible obstructions during parking of the automobile is to be started.

The transmission trigger which is transmitted at a multiple of the resonance frequency of the ultrasonic converter in the ultrasonic sensor is received in the ultrasonic sensor, and in step S2 is divided down to the resonance frequency of the ultrasonic converter. In other words, when the resonance frequency of the ultrasonic converter is 50 kHz, for example, and the number 2 is selected as the multiple, the transmission trigger is transmitted from the control unit to the ultrasonic sensor at 50*2 kHz, i.e., 100 kHz, and in the ultrasonic sensor is divided down to 50 kHz, the resonance frequency of the ultrasonic converter.

After the reception and division S2 of the transmission trigger, the ultrasonic sensor transmits via the ultrasonic converter an acoustic transmitted signal in order to scan the surroundings of the automobile, for example for obstructions during parking. As stated above, the acoustic transmitted signal may be, for example, an ultrasonic signal or a signal burst having a defined burst length and a defined signal frequency. A pulse repetition interval may result from the transmission trigger repeated by the control unit. Using the divided-down transmission trigger, the ultrasonic converter in the ultrasonic sensor is excited to trigger an acoustic transmission 25 (for example, for transmitting acoustic transmission bursts having a length of 300 μs at a base frequency of 50 kHz) via a transmission current driver. At that instant the converter may be regarded as a type of speaker.

If objects which might interfere with parking are present in the immediate vicinity relevant for the parking, the acoustic transmitted signal is reflected from such objects. The at least one reflected acoustic signal is the at least one acoustic received signal corresponding to the acoustic transmitted signal which also transmits information concerning the object, for example the distance of the object, which is proportional to the time between transmission and reception of the acoustic signal. Reflected acoustic transmitted signal, i.e., acoustic received signal, 26 is received after a time delay which corresponds to the acoustic propagation time and the distance of the object from the sensor converter. In step S3 the at least one acoustic received signal received from the ultrasonic converter is converted to an electrical received signal, and is then electrically transmitted from the sensor, via a second duplex channel at the resonance frequency of the ultrasonic converter in the ultrasonic sensor, in this case 50 kHz, to the control unit for further evaluation. The converter converts the acoustic received signal to an electrical received signal in the manner of a microphone. The electrical received signal may be further amplified if necessary.

According to the exemplary embodiments and/or exemplary methods of the present invention, a band for transmitting the transmission trigger corresponding to the field of application may be searched in such a way that interference with other devices located in the immediate vicinity during transmission of electrical signals (transmission targets, received signals, ultrasonic signals) may be greatly reduced. Only the trigger band is optional, in a manner of speaking, as a result of the divider in the ultrasonic sensor, and the analog reception channel remains fixed at 50 kHz as a result of the resonance of the ultrasonic converter.

The at least one electrical received signal to be transmitted from the ultrasonic sensor to the control unit may be impressed by a current source. The transmission trigger in turn may be impressed on the line by a voltage source. An additional separation of the corresponding duplex channels is achieved by the voltage-driven transmission of transmission triggers and the current-driven, i.e., electrical, transmission of acoustic received signals.

According to the refinement, for transmission of the transmission triggers and/or electrical received signals, for example, corresponding detectors may be provided as receivers at the end of the particular line. At the end of the particular line, for example, a high-resistance detector may be provided for the voltage operation, and a low-resistance detector may be provided for the current operation. In other words, the at least one electrical received signal may be received by a low-resistance detector in the control unit, and/or the transmission trigger may be received by a high-resistance detector in the sensor.

In addition, the pulse duty factor of the transmission trigger may be varied, thereby transmitting additional information, for example concerning a desired transmission current level. This information may be transmitted in addition to the information concerning transmission duration and transmission frequency. Furthermore, a transmission current which is proportional to the transmission acoustic pressure may be used in the sensor to excite the ultrasonic converter.

Figure 2:
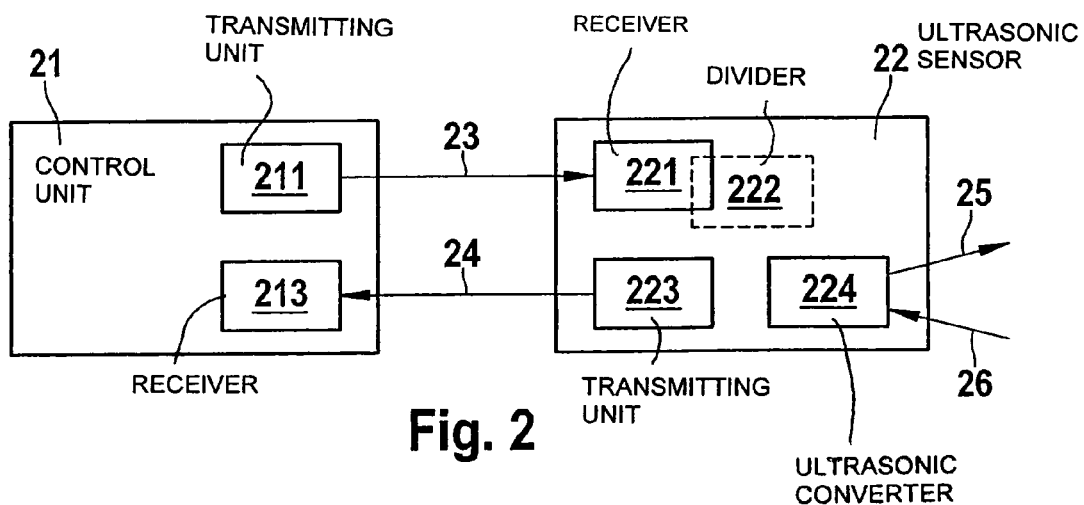
FIG. 2 shows a block diagram of the ultrasonic sensor and the device for controlling the ultrasonic sensor, i.e., the control unit, according to one specific embodiment of the present invention.

FIG. 2 shows a block diagram of the ultrasonic sensor and the device for controlling the ultrasonic sensor, i.e., the control unit, according to one exemplary embodiment of the present invention.

FIG. 2 shows a device for controlling an ultrasonic sensor, i.e., a control unit, 21, and shows ultrasonic sensor 22 itself. Ultrasonic sensor 22 is operated in duplex mode, and in FIG. 2 is connected via two duplex channels 23 and 24 to the control unit for communicating data or signals.

Control unit 21 has a sending or transmitting unit 211 for transmitting a transmission trigger (for example, a square wave signal having a length of 300 μs at a frequency of 100 kHz) to ultrasonic sensor 22 via duplex channel 23 at a multiple of the resonance frequency of an ultrasonic converter 224 in ultrasonic sensor 22, and has a receiver 213 for receiving at least one electrical received signal which corresponds to acoustic transmitted signal 25 and which is time-offset with respect to a reflective object corresponding to the acoustic signal propagation time, and which is transmitted from ultrasonic sensor 22 to control unit 21 via duplex channel 24 at the resonance frequency of ultrasonic converter 224 in the ultrasonic sensor.

Ultrasonic sensor 22 shown in FIG. 2 has a receiver 221 for receiving an (electrical) transmission trigger (for example, a square wave signal having a length of 300 μs at a frequency of 100 kHz) for triggering an acoustic transmitted signal 25, the transmission trigger being transmitted via a first duplex channel 23 at a multiple of the resonance frequency of ultrasonic converter 224 in ultrasonic sensor 22. Ultrasonic sensor 22 also has a divider 222, such as a flip-flop, for example, for dividing down the (electrical) transmission trigger to the resonance frequency of converter 224, and has a sending or transmitting unit 223 for transmitting at least one electrical received signal, corresponding to acoustic transmitted signal 25, via a second duplex channel 24 at the resonance frequency of ultrasonic converter 224 in ultrasonic sensor 22.

The transmission of a transmission trigger from control unit 21 to ultrasonic sensor 22 is indicated by an arrow in FIG. 2, the arrow also indicating corresponding duplex channel 23 used for the transmission. The transmission trigger is transmitted from sending or transmitting unit 211 of control unit 21 to receiver 221 of ultrasonic device 22.

The transmission of an electrical received signal from ultrasonic sensor 22 to control unit 21 is indicated by an arrow in FIG. 2, the arrow also indicating corresponding duplex channel 24 used for the transmission. The electrical received signal is transmitted from sending or transmitting unit 223 of ultrasonic device 22 to receiver 213 for control unit 21. As previously mentioned, the electrical received signal is obtained by acoustic transmitted signal 25 being reflected from a reflective object, and an acoustic received signal 26 being received from ultrasonic sensor 22 as the reflected signal from the object and being converted to the electrical received signal. Ultrasonic sensor 22 is thus designed to convert acoustic received signal 26 to an electrical received signal, for example using a converter installed in the ultrasonic sensor.

As discussed above, according to one refinement, transmission triggers may be transmitted in a voltage-driven manner. In addition, electrical received signals in turn may be transmitted in a current-driven manner.

When transmission triggers are transmitted via duplex channel 23 in a voltage-driven manner, sending or transmitting unit 211 of control unit 21 has a voltage source for the voltage-driven impression of transmission triggers on the line, and receiver 221 of ultrasonic sensor 22 has a high-resistance detector for receiving the transmission triggers.

When electrical received signals are transmitted in a current-driven manner, sending or transmitting unit 223 of ultrasonic sensor 22 has a current source for current-driven impression of the electrical received signals on the line, and receiver 213 of control unit 21 has a low-resistance detector for receiving electrical received signals.

The exemplary embodiments and/or exemplary methods of the present invention thus represents an operation of an ultrasonic sensor in duplex mode. As discussed in detail above, this is achieved using a method for operating an ultrasonic sensor in duplex mode, a corresponding ultrasonic control unit, and a corresponding device 21 for controlling ultrasonic sensor 22. An (electrical) transmission trigger for triggering an acoustic transmitted signal 25 is transmitted S1 from device 21 for controlling ultrasonic sensor 22 to ultrasonic sensor 22 via a first duplex channel 23 at a multiple of a resonance frequency of an ultrasonic converter 224 in ultrasonic sensor 22; the transmission trigger is divided down S2 to the resonance frequency of converter 224, using a divider 222 in ultrasonic sensor 22, and by use of this divided-down signal the converter is actuated by a transmission stage, which then produces an acoustic transmission; and at least one acoustic received signal 26 which correspond to acoustic transmitted signal 25 and which is delayed with respect to the reflection at an object due to the acoustic propagation time is converted by ultrasonic sensor 22, with the aid of the converter, to an electrical received signal, and the electrical received signal is transmitted S3 from ultrasonic sensor 22 to unit 21 for controlling ultrasonic sensor 22 via a second duplex channel 24 at the resonance frequency of ultrasonic converter 224 for ultrasonic sensor 22.

Although the exemplary embodiments and/or exemplary methods of the present invention has been described above on the basis of the exemplary embodiments, it is not limited thereto, and may be modified in numerous ways.

Thus, for example, various suitable components may be used, corresponding to their function, in the ultrasonic sensor and transmission trigger. The exemplary embodiments and/or exemplary methods of the present invention is not limited, for example, to a flip-flop for dividing down the transmission trigger.

Various frequency ranges may be used according to the exemplary embodiments and/or exemplary methods of the present invention, depending on the situation and the surroundings. The resonance frequency of the ultrasonic converter in the ultrasonic sensor is not limited to 50 kHz, nor is the multiple limited to the number 2. A number $2^n$, for example, could be selected as the multiple, but this possibility as well should not be construed as limiting.

What is claimed is:

1. A method for operating an ultrasonic sensor (22) in duplex mode, the method comprising:
   transmitting a transmission trigger to the ultrasonic sensor via a first duplex channel at a multiple of a resonance frequency of an ultrasonic converter in the ultrasonic sensor for triggering an acoustic transmitted signal;
   dividing down the transmission trigger in the ultrasonic sensor; and
   transmitting at least one electrical received signal corresponding to the acoustic transmitted signal from the ultrasonic sensor via a second duplex channel at the resonance frequency of the ultrasonic converter in the ultrasonic sensor.

2. The method of claim 1, further comprising:
   impressing the at least one electrical received signal using a current source.

3. The method of claim 2, further comprising:
   receiving the at least one electrical received signal using a low-resistance detector.

4. The method of claim 1, wherein the transmission trigger is impressed on the line by a voltage source.

5. The method of claim 4, further comprising:
   receiving the transmission trigger using a high-resistance detector.

6. The method of claim 1, further comprising:
   varying the pulse duty factor of the transmission trigger for further transmission of information.

7. The method of claim 6, further comprising:
   transmitting information concerning a desired transmission current level.

8. The method of claim 1, wherein a transmission current which is proportional to the transmission acoustic pressure is used.

9. An ultrasonic sensor, comprising:
   a receiver to receive a transmission trigger for triggering an acoustic transmitted signal via a first duplex channel at a multiple of the resonance frequency of an ultrasonic converter in the ultrasonic sensor;
   a divider to divide down the transmission trigger; and
   a transmitter to transmit at least one electrical received signal corresponding to the acoustic transmitted signal via a second duplex channel at a resonance frequency of an ultrasonic converter in the ultrasonic sensor.

10. The ultrasonic sensor of claim 9, wherein the first duplex channel transmits the transmission trigger in a voltage-driven manner.

11. The ultrasonic sensor of claim 10, wherein the receiver has a high-resistance detector for receiving the transmission trigger.

12. The ultrasonic sensor of claim 9, wherein the transmitter has a current interface for a current-driven transmission of the electrical received signal.

13. A device for controlling an ultrasonic sensor, comprising:
   a transmitter to transmit a transmission trigger for triggering an acoustic transmitted signal to an ultrasonic sensor via a first duplex channel at a multiple of a resonance frequency of an ultrasonic converter in the ultrasonic sensor; and
   a receiver to receive the at least one electrical received signal transmitted by the electronic sensor via the second duplex channel at the resonance frequency of the ultrasonic converter in the ultrasonic sensor, the electrical received signal corresponding to the acoustic transmitted signal;
   wherein the ultrasonic sensor includes a receiver to receive a transmission trigger for triggering the acoustic transmitted signal via the first duplex channel at the multiple of the resonance frequency of the ultrasonic converter in the ultrasonic sensor, a divider to divide down the transmission trigger, and a transmitter to transmit at least one electrical received signal corresponding to the acoustic transmitted signal via a second duplex channel at a resonance frequency of the ultrasonic converter in the ultrasonic sensor.

14. The device of claim 13, wherein the second duplex channel transmits the received signal in a current-driven manner.

15. The device of claim 14, wherein the receiver has a low-resistance detector for receiving the electrical received signal.

16. The device of claim 13, wherein the transmitter has a voltage interface for providing a voltage-driven transmission of the transmission trigger.

* * * * *